US012640114B2

(12) United States Patent
O'Shea et al.

(10) Patent No.: US 12,640,114 B2
(45) Date of Patent: May 26, 2026

(54) BILLBOARD FOR CONTEXT INFORMATION SHARING

(71) Applicant: Apple Inc., Cupertino, CA (US)

(72) Inventors: Helena Deirdre O'Shea, San Jose, CA (US); Matthias Sauer, San Jose, CA (US); Jorge L. Rivera Espinoza, San Jose, CA (US)

(73) Assignee: Apple Inc., Cupertino, CA (US)

( * ) Notice: Subject to any disclaimer, the term of this patent is extended or adjusted under 35 U.S.C. 154(b) by 105 days.

(21) Appl. No.: 18/622,030

(22) Filed: Mar. 29, 2024

(65) Prior Publication Data
US 2024/0242692 A1      Jul. 18, 2024

Related U.S. Application Data

(63) Continuation of application No. 17/818,237, filed on Aug. 8, 2022, now Pat. No. 11,978,422, which is a
(Continued)

(51) Int. Cl.
G06F 13/36          (2006.01)
G06F 12/14          (2006.01)
(Continued)

(52) U.S. Cl.
CPC ......... *G09G 5/006* (2013.01); *G06F 12/1458* (2013.01); *G06F 13/4027* (2013.01); *G06F 13/4221* (2013.01)

(58) Field of Classification Search
CPC .......................... G09G 5/006; G09G 2358/00; G06F 12/1458; G06F 13/4027; G06F 13/4221;
(Continued)

(56) References Cited

U.S. PATENT DOCUMENTS

| 8,341,174 B2 | 12/2012 | Hjelm et al. |
| 8,521,934 B1 | 8/2013 | Ni |

(Continued)

FOREIGN PATENT DOCUMENTS

| CN | 101167335 A | 4/2008 |
| CN | 103688488 A | 3/2014 |

(Continued)

OTHER PUBLICATIONS

International Preliminary Report on Patentability directed to related International Patent Application No. PCT/US2020/064349, mailed Aug. 11, 2022; 12 pages.
(Continued)

*Primary Examiner* — Henry Tsai
*Assistant Examiner* — Kim T Huynh
(74) *Attorney, Agent, or Firm* — Sterne, Kessler, Goldstein & Fox P.L.L.C.

(57)          ABSTRACT

Embodiments relate to a billboard circuit that stores context information received from various component circuits in an electronic device. The context information indicates an operating status of the corresponding component circuit, system or shared resources. The stored context information may be retrieved by one or more component circuits when events (e.g., turning on of a component circuit) are detected. By using the billboard circuit, a component circuit may detect changes in the operating status of other components circuits and configure or update its operations even when the changes occurred while the component circuit was asleep or disabled. The billboard circuit may monitor updating of the context information by the component circuit and initiate notification to other components circuits when certain entries of the context information is updated.

20 Claims, 8 Drawing Sheets

Related U.S. Application Data continuation of application No. 16/885,982, filed on May 28, 2020, now Pat. No. 11,443,713.

(60) Provisional application No. 62/967,982, filed on Jan. 30, 2020.

(51) Int. Cl.
*G06F 13/40* (2006.01)
*G06F 13/42* (2006.01)
*G09G 5/00* (2006.01)

(58) Field of Classification Search
CPC ......... G06F 12/1483; G06F 2212/1052; G06F 21/70; G06F 13/385; G06F 1/3209; G06F 1/3234; G06F 1/3287; G06F 13/105; G06F 13/4282; Y02D 10/00; Y02D 30/50; H04L 12/2861; H04L 12/12; H04L 12/40071
See application file for complete search history.

(56) References Cited

U.S. PATENT DOCUMENTS

| | | | |
|---|---|---|---|
| 9,154,312 | B2 | 10/2015 | Katar et al. |
| 10,031,847 | B2 | 7/2018 | Zhang et al. |
| 11,176,069 | B2 | 11/2021 | O'Shea et al. |
| 11,216,055 | B2 | 1/2022 | Lee et al. |
| 11,443,713 | B2 | 9/2022 | O'Shea et al. |
| 11,452,032 | B2 | 9/2022 | Gupta et al. |
| 2011/0063126 | A1 | 3/2011 | Kennedy et al. |
| 2011/0268024 | A1 | 11/2011 | Jamp |
| 2013/0007063 | A1* | 1/2013 | Kalra ................... G06F 16/972 707/E17.005 |
| 2013/0024706 | A1 | 1/2013 | Katar et al. |
| 2013/0346735 | A1 | 12/2013 | Lynch et al. |
| 2014/0298461 | A1 | 10/2014 | Hohndel et al. |
| 2016/0154735 | A1 | 6/2016 | Hwang et al. |
| 2016/0266633 | A1 | 9/2016 | Rabii et al. |
| 2016/0274923 | A1 | 9/2016 | Harriman |
| 2017/0075843 | A1 | 3/2017 | Wietfeldt et al. |
| 2019/0042497 | A1 | 2/2019 | Bhaskar et al. |
| 2019/0227962 | A1* | 7/2019 | O'Shea ............... G06F 13/4282 |
| 2019/0250691 | A1 | 8/2019 | Lee et al. |
| 2019/0303297 | A1 | 10/2019 | Fleming et al. |
| 2019/0371400 | A1 | 12/2019 | Farmahini Farahani et al. |
| 2020/0326769 | A1 | 10/2020 | Ansari et al. |
| 2021/0208899 | A1* | 7/2021 | Bornemann ............. G07C 5/08 |
| 2021/0241716 | A1 | 8/2021 | O'Shea et al. |
| 2022/0382701 | A1 | 12/2022 | O'Shea et al. |
| 2024/0242692 | A1* | 7/2024 | O'Shea ................. G06F 13/385 |

FOREIGN PATENT DOCUMENTS

| | | |
|---|---|---|
| CN | 105830053 A | 8/2016 |
| CN | 107003948 A | 8/2017 |
| CN | 107819928 A | 3/2018 |
| CN | 110134032 A | 8/2019 |
| CN | 110275849 A | 9/2019 |
| CN | 110301143 A | 10/2019 |
| DE | 102018132783 A1 | 8/2019 |
| EP | 3579093 B1 | 10/2021 |
| JP | 2007265306 A | 10/2007 |
| WO | 2014009323 A2 | 1/2014 |

OTHER PUBLICATIONS

PCT International Search Report and Written Opinion, PCT Application No. PCT/US2020/064349, Mar. 15, 2021, 19 pages.
United States Office Action, U.S. Appl. No. 16/885,982, filed Mar. 7, 2022, 13 pages.

* cited by examiner

Receive Context Information from First SOC at First Time
702

Update Memory in Billboard According to Received Context Information
710

Detect Event at Device in Second SOC
714

Send Context Information of First SOC to Second SOC at Second Time
718

BILLBOARD FOR CONTEXT INFORMATION SHARING

CROSS-REFERENCE TO RELATED APPLICATIONS

This application is a continuation of and claims priority to U.S. patent application Ser. No. 17/818,237, filed on Aug. 8, 2022, which is a continuation of and claims priority to U.S. patent application Ser. No. 16/885,982, filed on May 28, 2020, which claims priority under 35 U.S.C. § 119(e) to U.S. Provisional Patent Application No. 62/967,982 filed on Jan. 30, 2020, the content of which are all incorporated by reference herein in their entirety.

BACKGROUND

1. Field of the Disclosure

The present disclosure relates to coordinating operations of multiple integrated circuit (IC) chips in an electronic device.

2. Description of the Related Art

Electronic devices may include multiple systems on chips (SOCs) for communicating with other devices using various communication protocols. As the size of a communication system in an electronic device becomes smaller while the functionality of the communication system increases, more SOCs are incorporated into the electronic device or more subsystems are added to each SOC. These SOCs may communicate with a host (e.g., a central processor or an application processor) over a dedicated communication path (e.g., peripheral component interconnect express (PCIe)) to transmit data.

As a result of integrating multiple communication systems and other subsystems into the electronic device, various issues or complications may arise. These issues or complications include conflicts and constraints imposed by using shared communication channel such as a multi-drop bus between the SOCs and the subsystems.

SUMMARY

Embodiments relate to an electronic device that includes a billboard circuit that stores context information on an integrated circuit. The context information indicates an operating status of the integrated circuit. The context information may be sent from the integrated circuit to the billboard circuit over a multi-drop bus at a first time for storing in the billboard circuit. The context information may be retrieved and sent from the billboard circuit to another integrated circuit at a second time that is later than the first time after detecting an event. The other integrated circuit may change its operation in response to receiving the context information.

The figures depict, and the detailed description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments relate to a billboard circuit that stores context information received from various component circuits in an electronic device. The context information indicates an operating status of the corresponding component circuit, system or shared resources. The stored context information may be retrieved by one or more component circuits when events (e.g., turning on of a component circuit) are detected. By using the billboard circuit, a component circuit may detect changes in the operating status of other components circuits and configure or update its operations even when the changes occurred while the component circuit was asleep or disabled. The billboard circuit may monitor updating of the context information by the component circuit and initiate notification to other components circuits when certain entries of the context information is updated.

Example Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input.

The electronic device may also include one or more other physical user-interface devices, such as a physical keyboard, a mouse and/or a joystick.

Figure 1:
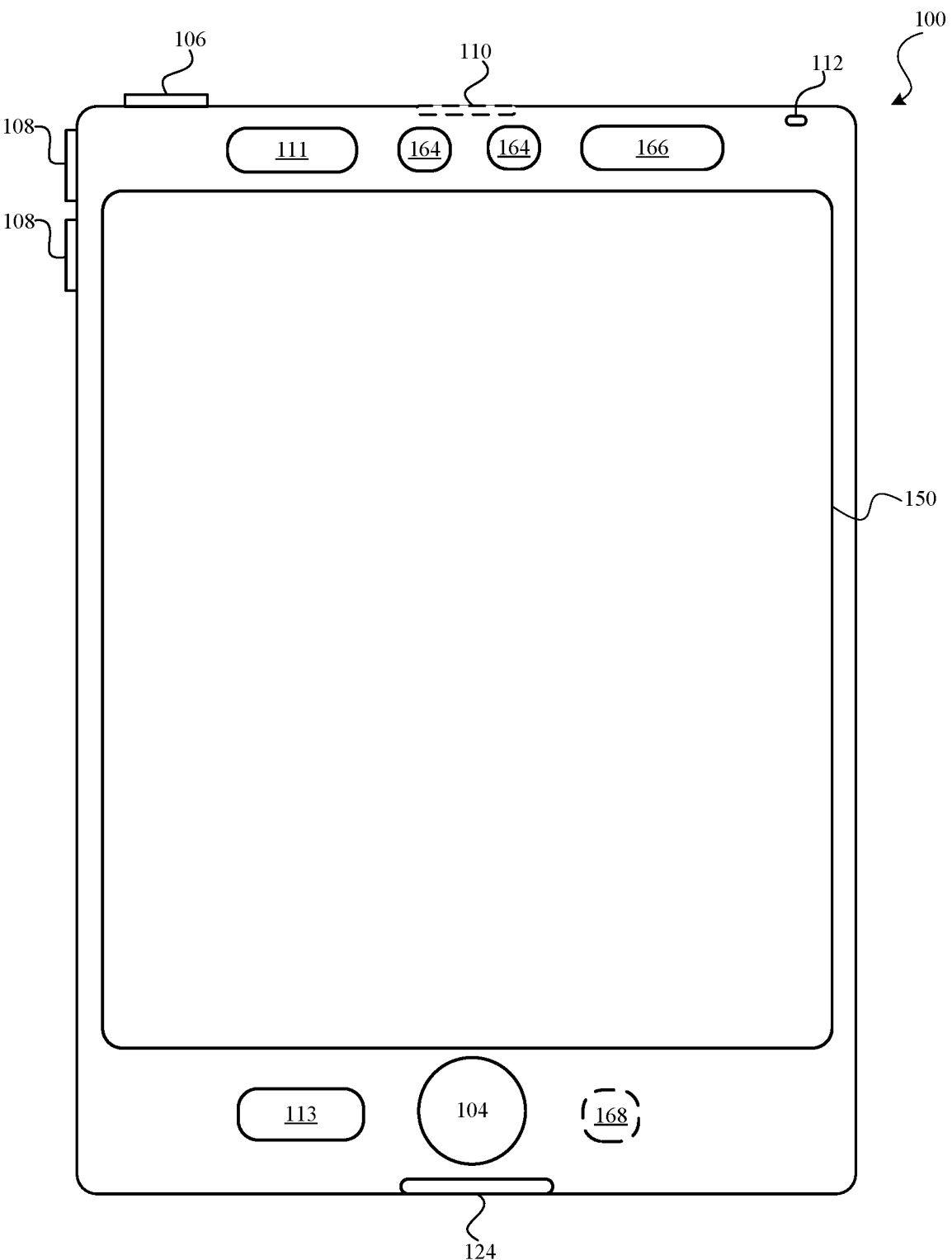
FIG. 1 is a high-level diagram of an electronic device, according to one embodiment.

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition to or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional image sensors 164 as the rear cameras of device 100.

Example Communication System in Electronic Device

Figure 2:
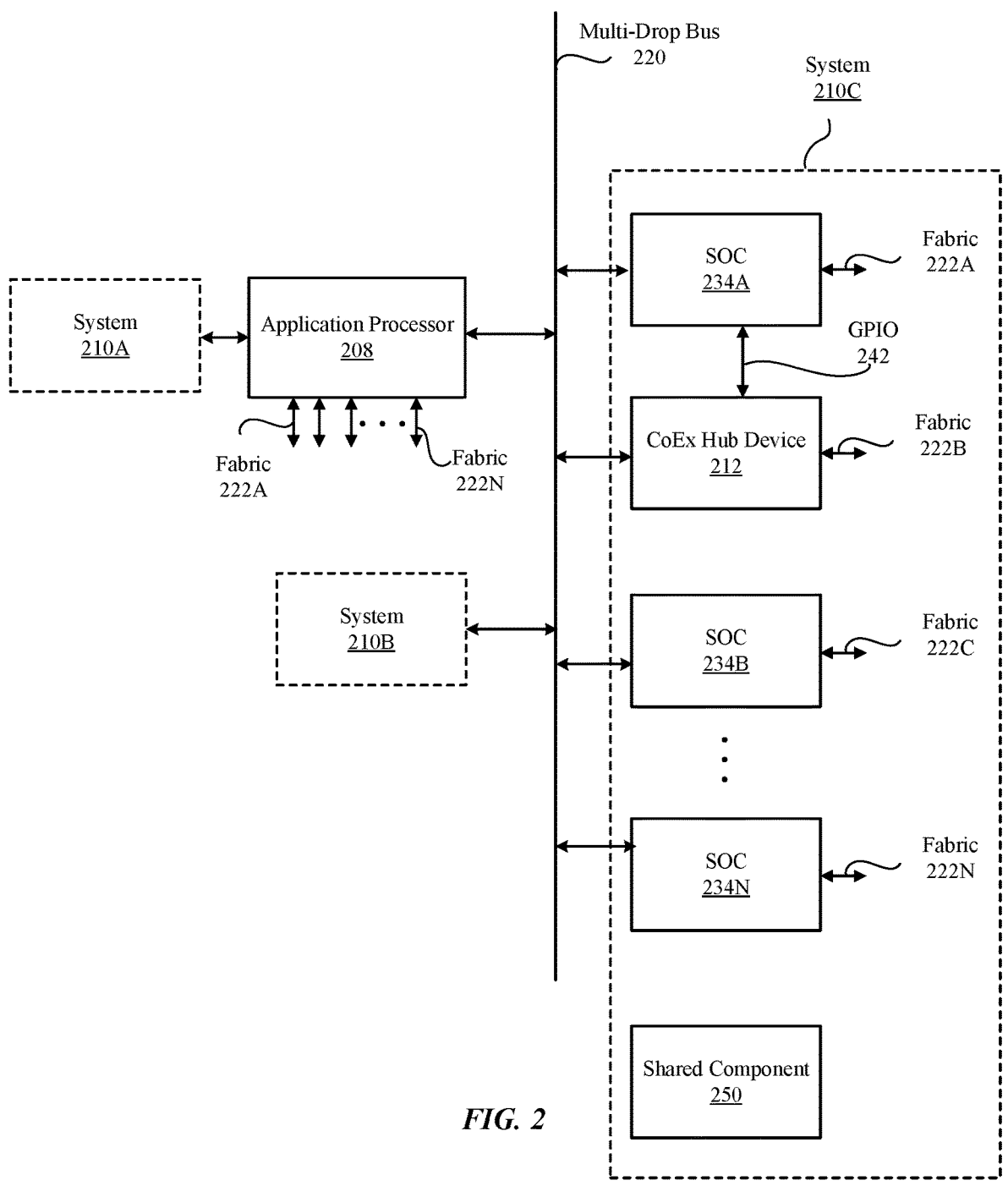
FIG. 2 is a block diagram illustrating components of the electronic device with multiple systems, according to one embodiment.

FIG. 2 is a block diagram illustrating components of electronic device 100, according to one embodiment. Electronic device 100 may include, among other components, an application processor 208 (also referred to as "a central processor" herein), systems 210A through 210C (collectively referred to as "systems 210" herein), a multi-drop bus 220, and fabrics 222A through 222N. Electronic device 100 may include other components not illustrated in FIG. 2 such as a power regulation circuit and radio components (e.g., power amplifier).

Each of systems 210 performs different functions in electronic device 100. For example, system 210A performs the function of displaying images on touch screen 150, system 210B performs the function of determining a location of electronic device 100, and system 210C performs the function of communicating with external devices. Each of systems 210 may include one more components circuits in the form of SOCs (e.g., integrated circuits). Electronic device 100 may include additional components (e.g., user interfaces) not illustrated in FIG. 2. Systems 210 may be directly connected to multi-drop bus 220 (e.g., as illustrated as systems 210B, 210C) or be coupled indirectly to multi-drop bus 220 via another component (e.g., as illustrated as system 210A communicating with multi-drop bus 220 via application processor 208).

Application processor 208 is a processing circuit in electronic device 100 for executing various operations. Application processor 208 may include one or more processing cores for executing various software programs as well as dedicated hardware circuits for performing specialized functions such as processing images, performing security operations, performing machine learning operations, and processing audio signals. Application processor 208 may also execute operations to coordinate the operations of other components in electronic device 100 including coexistence hub device 212 and SOCs 234. Application processor 208 can operate in multiple power modes including a low power mode where application processor 208 turns off most of its components to save power consumption, and a high-power mode where most of its components are active. Application processor 208 may also incorporate one or more communication components (e.g., cellular modem) that may also be embodied as a separate SOC. In one or more embodiments, application processor 208, in the low power mode, relays data between components connected over multi-drop bus 220. For this purpose, application processor 208 may (i) receive a signal from a device (e.g., SOCs 234, sensor devices 216 and coexistence hub device 212) over multi-drop bus 220, (ii) modify or copy the received signal according to a predetermined rule, and (iii) send the modified signal to another device (e.g., SOCs 234, sensor devices 216 and coexistence hub device 212) over multi-drop bus 220 to enable the SoCs 234 to communicate effectively.

An example system 210C is illustrated in FIG. 2 as including a coexistence hub device 212 (also referred to as "a coexistence hub device" herein) and SOCs 234A through 234N (collectively referred to as "SOCs 234" herein). SOCs 234 and coexistence hub device 212 may communicate over multi-drop bus 220.

Coexistence hub device 212 is a circuit or a combination of circuit and software that coordinates the operations of system 210C (including, e.g., coexistence hub device 212 and SOCs 234) and related components in electronic device 100. For this purpose, coexistence hub device 212 stores and executes an operation policy for defining and/or coordinating the operations of the communication system and the related components. The operation policy may for example, determine real time operations of components in system 210C based on factors such as operating conditions of system 210C, the length of time a communication subsystem remained in a waiting state, power consumption of each communication subsystem, and conditions of channels used by communication subsystems. Based on the operation policy, coexistence hub device 212 performs operations in advance to set up or prepare communication subsystems to activate or deactivate so that activation or deactivation communication subsystems occur without any error. In one or more embodiments, coexistence hub device 212 includes one or more subsystems that perform communication operations over various physical interfaces. By locally performing such coexistence operations at system 210C, application processor 208 may continue to operate in the low power mode for a longer time despite activities in system 210C, and also frees the resources of application processor 208 during its high-power mode. The details of coexistence hub device 212 is described below in detail with reference to FIGS. 3 through 4B.

In the example where system 210C is responsible for communicating with external devices, each of SOCs 234 may be a circuit, by itself or in conjunction with software or firmware, that performs operations for communicating with one or more external networks or devices using communication protocols or security protocols. Each of SOCs 234 and coexistence hub device 212 may handle different communication protocols and/or is associated with different wireless bands. For example, SOC 234A may perform processing for long range communication (e.g., cellular communication) while SOC 234B or coexistence hub device 212 handles short range communication (e.g., Bluetooth communication). Another example is sharing a lower level circuit component 250 (e.g., a power amplifier) by different SOCs 234. The operations of the SOCs 234 (e.g., using a communication protocol, a wireless band or a power amplifier) are at least partially controlled by coexistence hub device 212. An example of SOC 234B is described below in detail with reference to FIG. 5.

Fabrics 222 are communication channels enabling components in the communication system to communicate with application processor 208. One or more of fabrics 222 may be embodied as point-to-point connections such as Peripheral Component Interconnect Express (PCIe), I2C, or Serial Peripheral Interface (SPI). As illustrated in FIG. 2, SOC 234A, coexistence hub device 212 and SOCs 234B through 234N communicate with application processor 208 via corresponding fabrics 222A through 222N. One or more of fabrics 222 may have high bandwidth and low latency compared to multi-drop bus 220. Fabrics 222 illustrated in FIG. 2 may be physically separate communication channel or one or more shared physical channel with multiple logical sub-channels.

Multi-drop bus 220 is a communication channel that enables multiple components of the same system or different systems to communicate over a shared connection. Multi-drop bus 220 may be used primarily to transmit various messages including, but not limited to, data packets, timing packets and coexistence messages between components in the communication system. The data packets described herein refer to messages that include data for processing by devices, or systems communicating over multi-drop bus 220 such as SOCs 234 and coexistence hub device 212. The timing packets described herein refer to messages that indicates times when periodic events occur at one of SOCs 234 or coexistence hub device 212. The coexistence messages refer to messages for coordinating operations between SOCs 234 and coexistence hub device 212 or between subsystems on a pair of SOCs 234 that may share a common component (e.g., power management unit (PMU), power amplifier (PA) or low noise amplifier (LNA). These coexistence messages may be used to enable two communication subsystems with conflicting operating requirements to operate with an acceptable level of performance while the conflicting situation is active. Some of the coexistence messages may include context information or programming information for a component (e.g., PA and LNA) that is shared between systems to enable compatibility between the systems. In one or more embodiments, System Power Management Interface (SPMI) is used to embody multi-drop bus 220. Other serial bus interfaces such as I2C may be used instead of the SPMI to embody multi-drop bus 220. Although only a single multi-drop bus 220 is illustrated in FIG. 2, two or more multi-drop buses may be used.

One or more of the systems 210 may include a general purpose input/output (GPIO) that connects SOCs in the system to provide the context information indicating non-operable multi-drop bus 220 or fabric 222 due to issues such as low power level. For example, when coexistence hub device 212 detects that multi-drop bus 220 is not operating, coexistence hub device 212 may send the context information to SOC 234A via GPIO 242 to indicate such an event. Although only a single GPIO 242 is illustrated in FIG. 2, more GPIOs may be provided between coexistence hub device 212 and other SOCs 234B through 234N, or even with other systems (e.g., system 210B).

In one or more embodiments, a system (e.g., system 210C) may include shared resources such as shared components (e.g., component 250). Shared component 250 may be, for example, a lower level circuit component such as a power amplifier. Shared component 250 may for example, be shared by different SOCs 234 in a time multiplexed manner. Context information pertaining to the operation or sharing of such shared component 250 may be stored in coexistence hub device 212 and/or SOCs 234B. In another example, shared component 250 may use other multiplexing schemes (e.g., frequency multiplexing) to enable multiple SOCs to perform their operations simultaneously.

Although not illustrated in FIG. 2, coexistence hub device 212 may also control the operations or access to one or more antennas (not shown) associated with the communication system.

Example Architecture of Coexistence Hub Device

Figure 3:
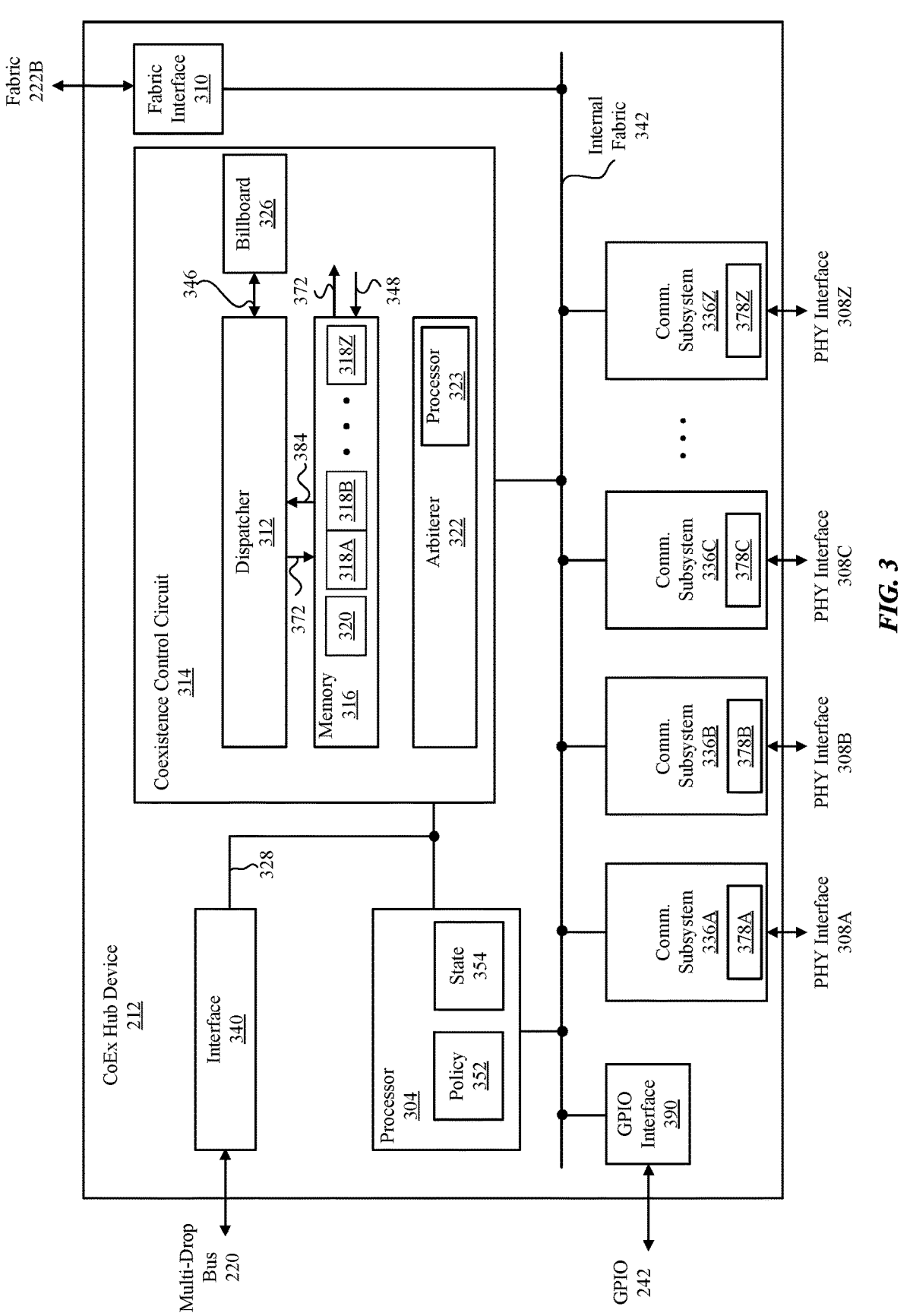
FIG. 3 is a block diagram illustrating a coexistence hub device, according to one embodiment.

FIG. 3 is a block diagram illustrating coexistence hub device 212, according to one embodiment. Coexistence hub device 212 coordinates operations of components in system 210C. Coexistence hub device 212 may also handle operations that are distinct from or partly overlap with operations performed by SOCs 234. In the following, coexistence hub device 212 is primarily described with reference to system 210C that performs communication with external devices. But this is merely an example, and system 210C may be associated with other multi-SOC systems such as display device, power management circuit and the global positioning system (GPS) system.

To perform its operations, coexistence hub device 212 may include, among other components, processor 304, coexistence control circuit 314, fabric interface 310, multi-drop interface 340, communication subsystems 336A through 336Z (collectively referred to as "communication subsystems 336"), GPIO interface 390 and internal fabric 342. Coexistence hub device 212 may include additional components not illustrated in FIG. 3 or may omit components illustrated in FIG. 3 (e.g., one or more of communication subsystems 336).

Processor 304 is a circuit, by itself or in conjunction with software or firmware, that controls the overall operation of the coexistence hub device 212 as well as coordinating operations of other SOCs 234 using coexistence messages. Processor 304 may include memory to store operation policy 352 for controlling the operations. The operation policy 352 may be received from application processor 208 via fabric 222B, fabric interface 310 and internal fabric 342. After receiving the operation policy 352, processor 304 may decode the operation policy 352 and program other components in coexistence hub device 212 (e.g., coexistence control circuit 314), if applicable, to enforce the operation policy 352. Additional information related to the operation policy 352 may also be received from application processor 208. Such additional may be stored or processed at processor 304 to affect how the operation policy 352 is implemented. Furthermore, processor 304 may send a portion of the operation policy 352 relevant to other SOCs 234, via multi-drop bus 220, to program SOCs 234 to operate according to the operation policy 352. The processor 304 may make coexistence decisions according to the operation policy 352 by analyzing coexistence messages (e.g., context information or requests) received via interface 340 from SOCs 234 and communication subsystems 336. The processor 304 may stores states 354 (e.g., context information) of communication subsystems 336 in the coexistence hub device 212 and the other SOCs 234. Current states 354 may include, for example, radio frequency (RF) bands/channels in use by SOCs 234 and coexistence hub device 212, transmission power of radio signals. Such information may also be sent to application processor 208 or other SOCs 234 to enable real-time adjustment of operations in other SOCs 234. Processor 304 may delegate some coordination operations (e.g., coordination for communication subsystems 336) to arbiterer 322.

The operation policy as described herein refers to scenarios of operating combinations in the communication system that may be problematic or combinations of components having interworking issues, and also a set of rules that define the operations to be taken by SOCs 234 and coexistence hub device 212 to resolve or cope with such problematic scenarios. In some embodiments, the operation policy may include firmware code and enable dynamic response to maintain a balanced operation between multiple communication subsystems.

Each of communication subsystems 336 includes a circuit to process signals received from or for sending to corresponding physical layer interfaces 308A through 308Z (collectively referred to as "physical layer interfaces 308") external to coexistence hub device 212. Such circuits may include local processors 378A through 378Z (collectively referred to as "local processors 378") that perform one or more of the following operations: (i) execute commands associated with certain communication protocols, (ii) process received input communication signals according to a corresponding protocol to decode the input radio signals and respond by encoding certain responses within required time budgets on the RF link, (iii) control an associated radio frequency (RF) path to adjust transmit power or receive gain control, and (iv) configure, disable or enable components in the communication subsystem 336 based on the operation policy. All local processors 378 or at least a subset of these local processors 378 may be initialized (e.g., by application processor 208 or automatically) when coexistence hub device 212 is initialized. Among other things, the local processors 378 are programmed with a portion of the operation policy relevant to the operations of their communication subsystems 336. The operation policy downloaded to a local processor 378 of a communication subsystem 336 may define how the communication subsystem 336 should operate (e.g., the data rate of the communication subsystem, turning on or off of components in the communication subsystem 336, and changing the number of active transmitters). Alternatively, the relevant portion of the operation policy may be sequentially downloaded and programmed directly by application processor 208 through fabric 222B or processor 304 as each of communication subsystems 336 are turned on. One or more of communication subsystems 336 may communicate with physical layer interfaces (e.g., RF devices) via, for example, Radio Frequency Front-End Control Interface (RFFE).

In some embodiments, physical layer interfaces 308 may be merged into a reduced set where a local processor 378 supports more than one communication protocols or switch between different communication protocols over time. Local processor 387 may control a fixed set of radio paths or only front-end switches, LNAs or PAs may be controlled by physical layer interfaces 308.

Interface 340 is a circuit or combinations of a circuits and software for communication with multi-drop bus 220. In one or more embodiments, interface 340 includes circuit components for processing data into outbound packets for sending over multi-drop bus 220, and unpacking inbound packets received from multi-drop bus 220 into data for processing in coexistence hub device. The interface 340 is connected to processor 304 and coexistence control circuit 314 via connection 328.

Fabric interface 310 is a circuit or a combination of a circuit and software for enabling coexistence hub device 212 to communicate with application processor 208 over fabric 222B. Fabric interface 310 is also referred to as an internal communication channel herein. In one or more embodiments, fabric interface 310 performs operations such as buffering, segmenting/combining data, serializing/deserializing and packaging/unpacking of data for communication over a point-to-point communication channel (e.g., PCIe). As illustrated in FIG. 3, fabric interface 310 is connected to internal fabric 342 to enable communication of components in coexistence hub device 212 with application processor 208.

Coexistence control circuit 314 is a circuit, by itself or in conjunction with software that processes coexistence messages transmitted over multi-drop bus 220. Coexistence control circuit 314 is programmed by processor 304 to enforce the operation policy 352 by making real time decisions on coexistence events, distribute inbound coexistence messages to relevant communication subsystems 336, sharing real time coexistent messages among communication subsystems 336 and sending outbound coexistence messages to other SOCs 234. The coexistence event described herein refers to a condition or occurrence defined by the operation policy that would prompt coordinating of operations in components of electronic device 100.

Specifically, coexistence control circuit 314 may include, among other components, dispatcher 312, memory 316, arbiterer 322 and billboard 326. Dispatcher 312 is a programmable circuit or a circuit in combination with software or firmware for filtering and sending messages for each communication subsystems 336 to memory 316. The details of the dispatcher 312 and its functions are described below with reference to FIG. 4A.

Memory 316 has multiple buffers 318A through 318Z (collectively referred to as "buffers 318") where each buffer corresponds to each of communication subsystems 336. Each of buffers 318 receives and stores inbound messages (received from components outside coexistence hub device 212 via multi-drop bus 220) relevant to a corresponding communication subsystem 336. The stored inbound coexistent messages in a buffer 318 may be sent to a corresponding communication subsystem 336 (as indicated by arrow 372) based on priority (e.g., time sensitive data has a higher priority relative to time insensitive data) via an internal fabric 342. If one or more communication subsystems 336 are inactive, buffers 318 stores the messages until the communication systems 336 are turned on and become available to receive the messages. In one or more embodiments, different buffers 318 may be associated with different priorities. When a buffer assigned with high priority is filled with a message, a communication system 336 may wake up to service to ensure that the message is handled in a timely manner. Each of buffers 318 also stores outbound messages 348 (received from a corresponding communication subsystem 336 via internal fabric 342). The outbound messages are retrieved by dispatcher 312 and sent out over multi-drop bus 220 to components outside coexistence hub device 212, also based on priority (e.g., time sensitive data has a higher priority relative to time insensitive data).

Memory 316 also includes shared memory section 320 that may be accessed by arbiterer 322 to resolve conflicting use of resources and by different local processors 378 to exchange time-sensitive messages among communication subsystems 336. Communication subsystems 336 may submit their tasks along with requests from other SOCs 234 to memory queues to be serviced by arbiterer 322.

Billboard 326 is a circuit, by itself or in conjunction with software or firmware, that stores context information of (I) other SOCs in the same system (e.g., SOCs 234A through 234N), (ii) SOCs in other systems (e.g., systems 210A, 210B) and/or (iii) subsystems 336 within coexistence hub device 212. The context information from other systems or SOCs in system 210C is received via multi-drop bus 220 using interface 340 and connection 328. The received context information is received through dispatcher 312 which sends context information to billboard 326, as applicable. The context information 346 is received from communication subsystems 336 and stored in billboard 326 for access. In addition to context information, billboard 326 may also store a subset of data packets transmitted over multi-drop bus 220. Such data packets may made available to other SOCs that was, for example, in a sleep state and was unable to receive the data packets while the data packets were being transmitted by a source SOC.

The stored context information can then be used to trigger one or more operations on the coexistence hub device 212 or other SOCs that later receive the stored context information. Billboard 326 enables external systems (e.g., systems 210A and 210B), SOCs in system 210C and/or components (e.g., communication subsystems 336) in the coexistence hub device 212 to accurately determine operating context of other systems, SOCs or components by accessing the context information in billboard 326. The context information can be sent from coexistence hub device 212 to external systems, SOCs in the same system 210C and/or components directly via multi-drop bus 220 or GPIO 242. Alternatively, the context information can be sent to a first recipient (e.g., a system, a SOC and/or a component), processed (e.g., filtered or converted) at the first recipient, and then the processed version of the context information sent to a second recipient (e.g., another system, another SOC and/or another component). Even if a subset or all other external systems, SOCs or communication subsystems are turned off and unavailable to provide the context information, recent context information is stored and available for retrieval and access by other systems, other SOCs or components of coexistence hub device 212. An example structure and functions of billboard 326 are described below in detail with reference to FIG. 4B. The billboard can also be used to convey current state of another SoC to the recipient SoC regardless of radio sleep state of the recipient. This allows external systems to update the sleeping system of some critical state.

Arbiterer 322 is a circuit, by itself or in conjunction with software or firmware, that makes decisions on real time coordination of operations of communication subsystems 336 and sends out the decisions to the communication subsystems 336 over internal fabric 342 and memory 316. Such decisions may include resolving competing needs of common resources by multiple communication subsystems 336 or requests for incompatible resources by different communication subsystems 336. Arbiterer 322 makes the decisions in real time, which may remain effective for a shorter time period compared to decisions made at processor 304 to implement the operation policy 352. In addition, arbiterer 322 may resolve requests for use of resources by external communication subsystems that compete with the local communication subsystems 336 for use of the same resource. For this purpose, arbiterer 322 may access current states 354 of communication subsystems 336 and the other SOCs 234 stored in processor 304 as well as using information about the priority of the different competing operations. The algorithm for resolving the resource conflicts at arbiterer 322 may be adjusted based on the operation policy 352 executed by processor 304. Arbiterer 322 may be programmed by processor 304 or application processor 208. The decision made by arbiter arbiterer 322 may include controlling RFFE transactions associated with communication subsystems 336, for example, to change the settings of an external RF device. Such operation may include blanking a power amplifier transmission of corresponding communication subsystem 336. Because the real-time decisions are sent out over shared internal fabric 342, a communication subsystem (e.g., communication subsystem 336A) may receive the decisions intended for another communication subsystem (e.g., communication subsystem 336B) and adjust its operations accordingly. Arbiterer 322 may include processor 323 to control the overall operation of arbiterer 322.

In one or more embodiments, processor 304 determines a larger scale coordination operation based on its operation policy 352, and configures components of coexistence control circuit 314, communication subsystems 336 and possibly SOCs 234 to enforce the operation policy 352. Arbiterer 322, on the other hand, coordinates a smaller scale, real time coexistence operations that are consistent with the larger scale coordination operation as defined by operation policy 352.

GPIO interface 390 is a circuit that enables other SOCs (e.g., SOC 234A) to communicate with components of coexistence hub device 212 via GPIO 242.

The components of coexistence hub device 212 illustrated in FIG. 3 are merely illustrative. Coexistence hub device 212 may include fewer components (e.g., lack memory 316 or separate processor 304) or include additional components (e.g., general purpose input/output) not illustrated in FIG. 3.

Example Architecture of Dispatcher

Figure 4A:
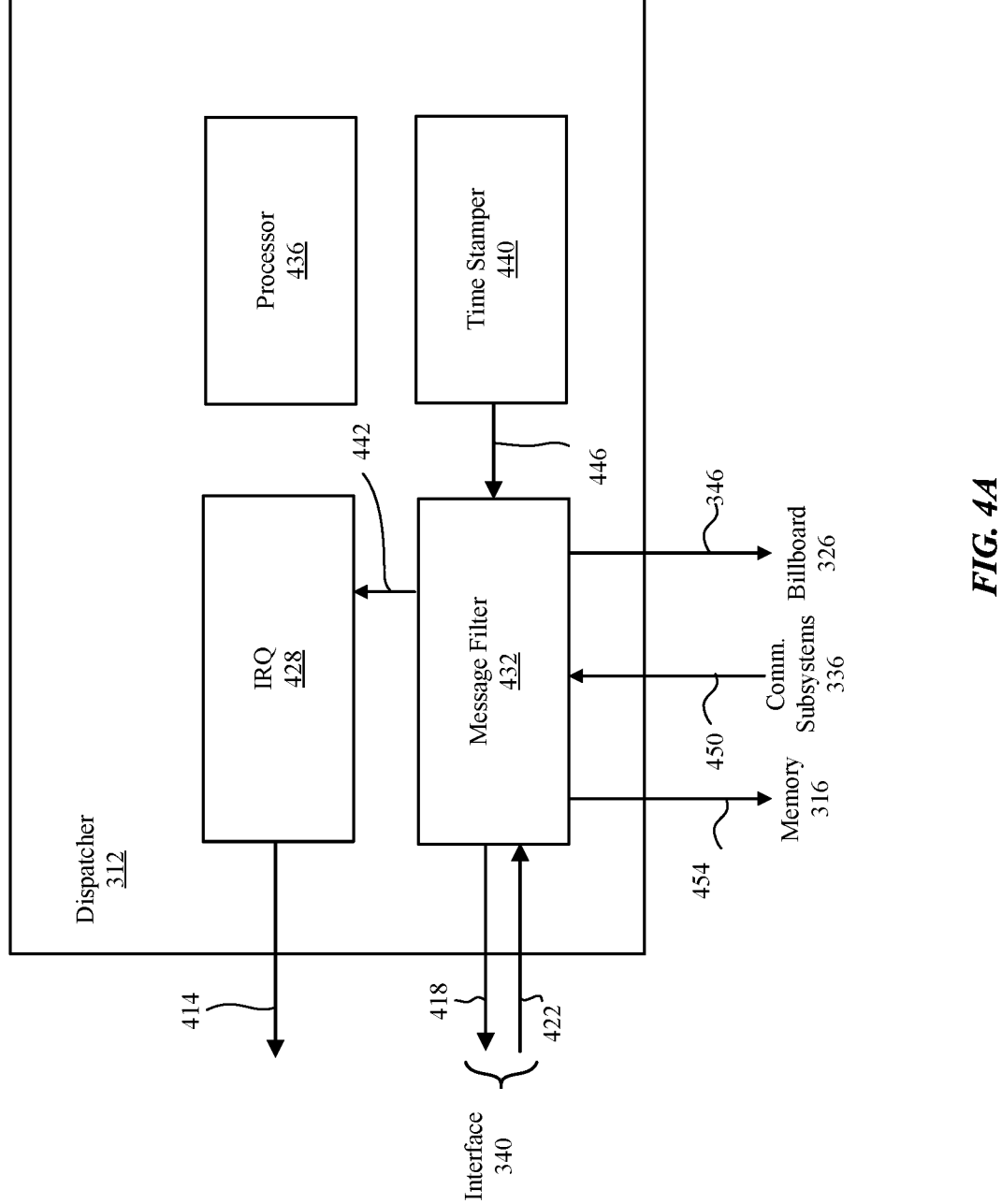
FIG. 4A is a block diagram of a dispatcher in the coexistence hub device of FIG. 3, according to one embodiment.

FIG. 4A is a block diagram of dispatcher 312 in coexistence hub device of FIG. 3, according to one embodiment. Dispatcher 312 is a circuit or a combination of circuit, software and/or firmware for processing messages. Dispatcher 312 determines when outbound messages from communication subsystems 336 should be sent to the processor 304 or SOCs 234, and when the time arrives, forwards the outbound messages to interface 340 for sending over multi-drop bus 220. The times for sending the outbound messages are determined based on the priority of the outbound messages, whether other messages are remaining in the memory 316 for sending over multi-drop bus 220, and when arbitration for using multi-drop bus 220 for transmitting data is successful. Dispatcher 312 also receives messages from SOCs 234 over multi-drop bus 220 and forward them to the communication subsystems 336 over internal fabric 342.

Dispatcher 312 may include, among other components, processor 436, interrupt manager 428, time stamper 440 and message filter 432. One or more of interrupt manager 428, time stamper 440 and message filter 432 may be embodied as firmware of software executed by processor 436. Also, additional components may be added to dispatcher 312.

Processor 436 is a circuit that may perform various operations in dispatcher 312 such as (i) managing contending resources within each communication subsystem 336, (ii) control external RF control blocks outside of coexistence hub device 212, (iii) support the functions and operations of arbiterer 322, and (iv) coordinating reporting of the results from arbiterer 322 to components on the multi-drop bus 220. Processor 436 may be a part of processor 304 or it may be a standalone processor. Processor 436 may also update the operations of other components in dispatcher 312 over time or depending on the activities in electronic device [110] 100.

Message filter 432 is hardware, software, firmware or a combination thereof that receives inbound messages 422 from multi-drop bus 220 via interface 340, filters inbound messages 422 for relevancy to billboard 326 and communication subsystems 336, and sends the filtered inbound messages 454 to appropriate buffers 318 and/or shared section 320 of memory 316 and context information 346 to billboard 326. Message filter 432 may also redirect the inbound messages 454 to buffers associated with communication subsystems 336 other than a default communication subsystem 336 to ensure that the active communication subsystems 336 receives all relevant inbound messages. By configuring message filter 432, a communication subsystem (e.g., 336A) may receive an inbound intended for another communication subsystem (e.g., 336B) as well and take such inbound message into account for its operation. If an inbound message includes an interrupt, the message filter 432 sends the corresponding coexistence message 442 to interrupt manager 428.

Interrupt manager 428 is hardware, software, firmware or a combination thereof that manages interrupts. When interrupt manager 428 receives the coexistence message 442 including an interrupt, interrupt manager 428 extracts the interrupt and sends out an interrupt signal 414 to corresponding communication subsystem 336. The interrupt signal 414 can cause the corresponding communication subsystem 336 to shut down, power down a subset of its components, wake-up from a power down mode or indicate real time state of components on multi-drop bus 220 (e.g., SOCs 234). These interrupt signals may only involve a simple decoder and no microprocessor, which enables low cost components to send interrupt signals for communicating a simple message over multi-drop bus 220. One of the characteristics of the interrupt signals is that they are sticky, meaning that even if an SOC (e.g., SOC 234B) is asleep or disabled when a coexistence hub device 212 sends an interrupt signal, the SOC (e.g., SOC 234B) will respond to the interrupt signal after the SOC (e.g., SOC 234B) wakes up at a later time. These interrupt signals can also be used to guarantee that an external SOC (e.g., SOC 234B) may abruptly go to inactive/sleep state without requiring other components (e.g., SOC 234A) to stay awake long enough to complete handshake operations with the SOC (e.g., SOC 234B). By using always on interrupt signals, the burden on the originating message source may be reduced.

Message filter 432 may also receive interrupt signal 450 from communication subsystems 336. If the interrupt signal 450 is intended for SOCs 234, message filter 432 sends the interrupt signal 450 as an outbound coexistence message 418 to interface 340 for sending out via multi-drop bus 220. An interrupt signal between the communication subsystems 336 is transmitted over internal fabric 342 without intervention of coexistence control circuit 314.

Time stamper 440 is a circuit that keeps track of time for incoming and outgoing messages on multi-drop bus 220.

Example Architecture of Billboard

Figure 4B:
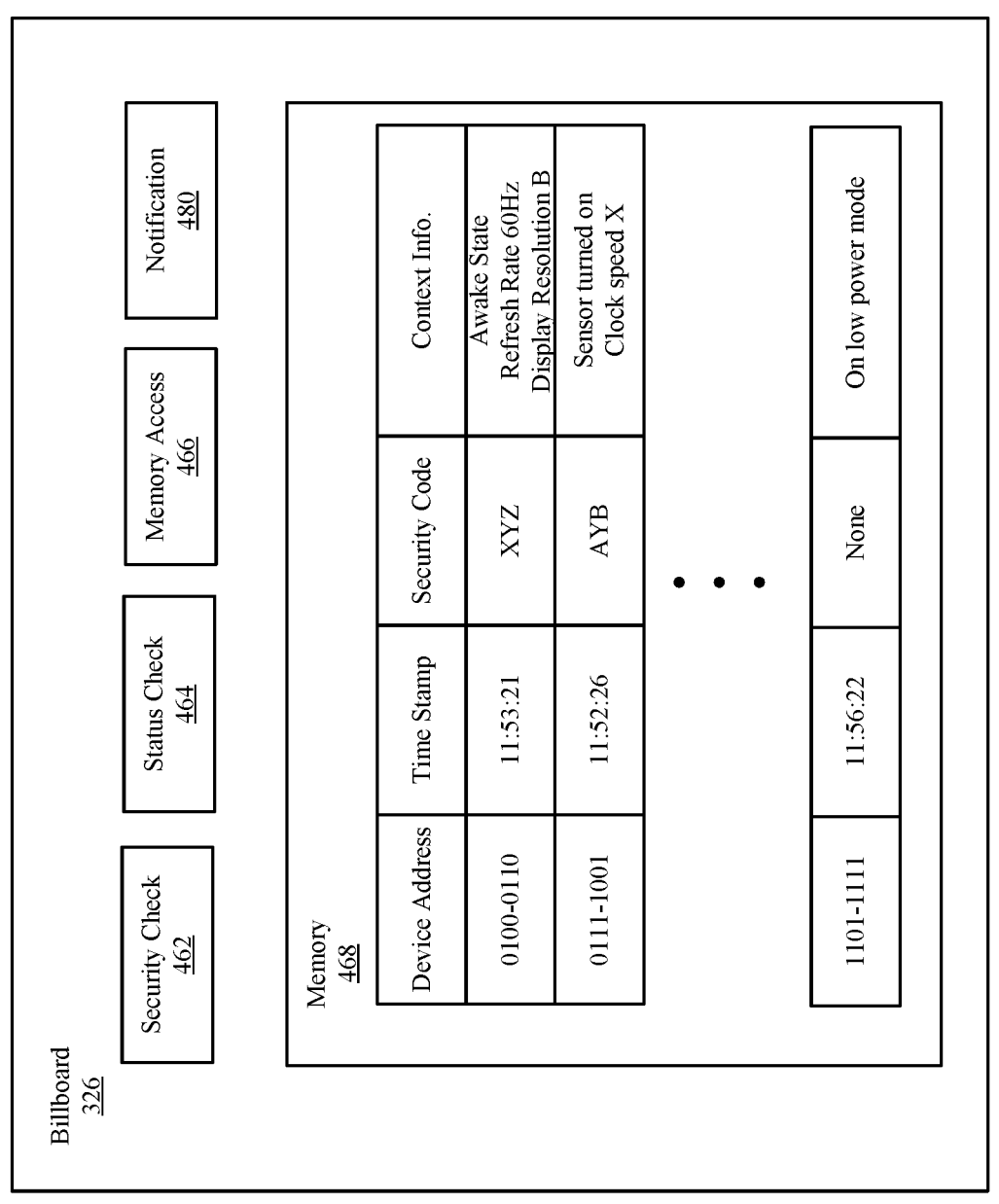
FIG. 4B is a block diagram of a billboard in the coexistence hub device, according to one embodiment.

FIG. 4B is a block diagram illustrating billboard 326, according to one embodiment. Billboard 326 may include, among other components, security check circuit 462, status check circuit 464, memory access circuit 466, notification circuit 480 and memory 468. Billboard 326 can include additional components or fewer components than FIG. 4B. For example, security check circuit 462 and/or status check circuit 464 can be omitted.

Security check circuit 362 is hardware or a combination of hardware and software that determines whether a SOC or device requesting writing of context information or a SOC or device requesting reading of the stored context information is authorized to access memory 468. For this purpose, security check circuit 362 may determine the device address and the security code included in the write/read request from the SOC or device match corresponding entries in memory 468. If the device address and the security code match, security check circuit 362 enables memory access circuit 466 to read or write context information to or from memory 468.

Status check circuit 464 is hardware or a combination of hardware and software that determines whether a SOC or device in external system (e.g., system 210A, 210B) or within the same system (e.g., system 210C) is currently active or inactive. Status check circuit 464 may receive periodic heartbeat messages from the SOC or device and perform operations such as updating and/or locking the context information of the corresponding SOC or device stored in memory 468. Status check circuit 464 may also implement a mechanism to ensure that the context information stored in memory 468 is the most recent. Billboard may also support mechanisms to alert communication systems within the SoC of an update.

Memory access circuit 466 is hardware or a combination of hardware or software that enables reading or writing of the context information from or to memory 468. In one or more embodiments, memory access circuit 466 performs the operations of writing or reading the context data when security check circuit 462 authorizes the reading or writing operation.

Notification circuit 480 is hardware or a combination of hardware or software that tracks updates in the context information in memory 468, and sends notification to communication subsystems 336, SOCs 234 or system 210B. For this purpose, notification requests from communication subsystems 336, SOCs 234 and/or system 210B may be registered in notification circuit 480 for certain events or conditions. Notification circuit 480 monitors changes to entries or fields in memory 468. When the changes to entries or fields in memory 468 correspond to the certain events or conditions, notification circuit 480 sends out notification or context information to registered communication subsystems 336, SOCs 234 or system 210B via multi-drop bus 220, fabric 222B or GPIO 242.

In one or more embodiments, notification circuit 480 may update or process the context information in memory 468 before sending it out to communication subsystems 336, SOCs 234 or system 210B. The notification or context information sent to the registered communication subsystems 336, SOCs 234 or system 210B may be processed at communication subsystems 336, SOCs 234 or system 210B, and sent to other subsystems, SOCs or systems.

Memory 468 stores the context information received from SOCs and/or devices in various systems 210. The context information for one SOC or device in a system (e.g., system 210B) may be available for access by other SOCs or devices in other systems (e.g., system 210A) upon request. Hence, when an SOC or device in the other systems (e.g., system 210A) is placed in a sleep mode and then become active, the SOC or device in the other system (e.g., system 210A) may access memory 468 to receive the context information of other SOCs or devices in the system (e.g., system 210B) which may have changed while the SOC or device of the system (e.g., system 210A) was in a sleep mode. Similarly, the SOC in the same system (e.g., SOC 234A) may receive the context information of another SOC (e.g., SOC 234B) that may have changed while the SOC (e.g., SOC 234A) was in a sleep mode.

Memory 468 may also store a subset of data packets 492 communicated over multi-drop bus 220. These data packets 492 may be accessed and retrieved by SOCs 234 or other components of coexistence hub device 212. In some cases, a new data packet replaces a corresponding outdated data packet, while in other cases, both old and new data packets are retained in memory 468 for later retrieval.

The context information stored in memory 468 may be associated with other data fields including, but not limited to, device address, time stamp and security code. The device address refers to a physical or logical address of the SOC or device associated with the context information. The time stamp indicates the time when the context information was sent from the corresponding SOC or device or the time when the context information was received at coexistence hub device 212. The security code indicates data for authenticating whether the read or write request of the context information, and may be used by security check circuit 462 to approve or refuse the read or write request received at billboard 326.

In the example of FIG. 4B, memory 468 stores the context information of a display device in its first entry. The display device uses a device address of 0100-0110, and its most recent context information is received at time 11:53:21. The entry includes a security code of XYZ, and the context information indicates that the display device is an active awaken state and operating at the refresh rate of 60 Hz and display resolution B. The second entry indicates that the context information is related to a proximity sensor module. The context information was received at time 11:52:26, is associated with a security code of AYB, and indicates that the sensor is turned on and operating with its local clock running at speed X. The last entry of memory 468 relates to a power control module that is currently operating at a low power mode. The entries, devices and context information explained above with reference to FIG. 4B are merely illustrative. Memory 468 may store the context information in various other formats and include various other information.

Example Architecture of SOC

Figure 5:
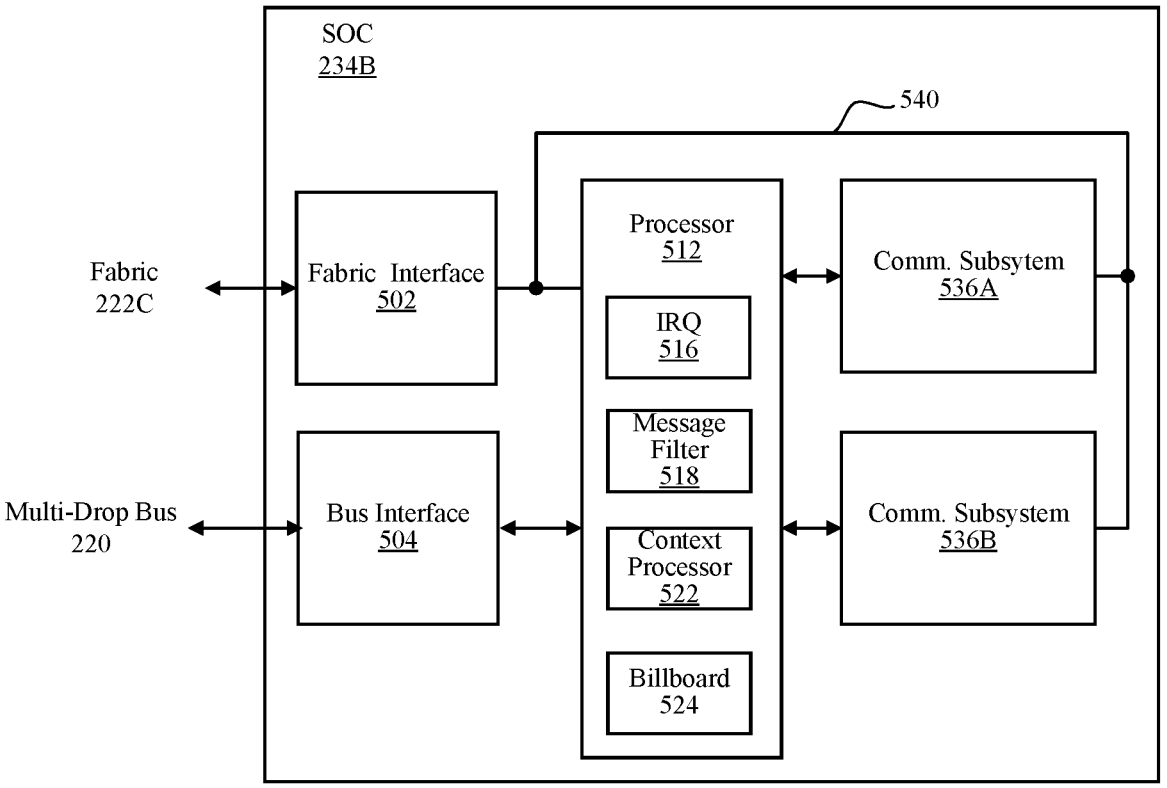
FIG. 5 is block diagram of a SOC communicating with the billboard, according to one embodiment.

FIG. 5 is a block diagram of SOC 234B, according to one embodiment. Although SOC 234B is illustrated in FIG. 5 as an example, other SOCs 234A and 234C through 234N may have the same or similar architecture as SOC 234B. SOC 234B may send messages including the context information to coexistence hub device 212 or other SOCs and/or receive messages including context information of other SOCs from coexistence hub device 212 or other SOCs over multi-drop bus 220.

In the example where system 210C is a communication system, SOC 234B can execute one or more communication protocols using its communication subsystems 536A, 536B (collectively referred to as "communication subsystems 536"). Although only two communication subsystems 536A, 536B are illustrated in FIG. 5, more than two communication subsystems or only a single communication subsystem may be included in SOC 234B. Each of communication subsystems 536A, 536B may be associated with different communication protocols, or both may be associated with the same communication protocol. Communication subsystems 536 are substantially identical to communication subsystems 336 of coexistence hub device 212 except that messages associated with communication subsystems 536 are processed by processor 512 instead of coexistence control circuit 314. Communication subsystems 536 can send the context information over multi-drop bus 220 to coexistence hub device 212 to enable coordinated operations with other systems, SOCs and/or coexistence hub device 212. Inbound messages to SOC 234B are processed locally by processor 512 and sent to corresponding communication subsystems 536. Other detailed explanation on communication subsystems 536 is omitted herein for the sake of brevity.

In addition to communication subsystems 536, SOC 234B may further include, among other components, fabric interface 502, bus interface 504, processor 512 and an internal bus 540 for connecting these components. SOC 234B may include further components such as memory for buffering incoming or outgoing messages.

Bus interface 504 is a circuit, by itself or in conjunction with software or hardware, that enables components of SOC 234B to communicate with coexistence hub device 212 and other SOCs over multi-drop bus 220. Bus interface 540 may perform the same function and have the structure as interface 340 described above with reference to FIG. 4B.

Fabric interface 502 is a circuit, by itself or in conjunction with software or hardware, that enables components of SOC 234B to communicate with application processor 208 over fabric 222C. The communication of fabric interface 502 is capable of transmitting data at faster speed and higher bandwidth than the communication over bus interface 504.

Processor 512 manages overall operation of SOC 234B. Processor 512 may include, among other components, interrupt manager 516, message filter 518 and context processor 522 as software or hardware components. The functions and operations of interrupt manager 516 and message filter 518 are substantially the same as those of interrupt manager 428 and message filter 432, and therefore, detailed explanation of these components is omitted herein for the sake of brevity.

Context processor 522 determines the current operating status of SOC 234B and generates context information corresponding to SOC 234B. Context information of SOC 234B may include, for example, the operating mode of SOC 234B (e.g., sleep mode vs. active mode), communication frequency of communication subsystems 536A, 536B and whether any of its components are disabled or its operations is restricted to prevent any coexistence issues. In one or more embodiments, context processor 522 also receives the context information of other SOCs 234 or other systems (e.g., systems 210A, 210B) and updates the operation of SOC 234B. For example, if the received context information indicates that another SOC (e.g., SOC 234C) is performing radio operations using a frequency band, SOC 234B may choose another frequency band that does not interfere with the other SOC. Alternatively, if the context information indicates that another SOC is using a shared PA, SOC 234B may wait till the other SOC releases the shared PA.

In one or more embodiments, context processor 522 may also request the context information from billboard 326 when a change to the operation of SOC 234B. That is, before the operation of SOC 234B is changed, context processor 522 requests the context information to billboard 326, receives the context information from billboard 326 and confirms if the changed operation would cause any coexistence issues. If the change causes any coexistence issues, context processor 522 may take actions to prevent the coexistence issues, or wait until the coexistence issue is no longer present. For this purpose, context processor 522 may register at notification circuit 480 to receive context information when the coexistence is no longer present. The actions that can be taken to prevent the coexistence issues may include, among others, sending a command to other a subsystem, another SOC or another system to change the operations, and sending a request to coexistence hub device 212 to take actions to resolve the coexistence issues.

The components and architecture of SOC 234B are merely illustrative. In other embodiments, SOC 234B may include only one communication subsystem or more than two communication subsystems. Moreover, SOC 234B may include other components not illustrated in FIG. 5.

In one or more embodiments, SOC 234B also includes its own billboard 524. Billboard 524 may be substantially the same as billboard 326 in coexistence hub device 212. Billboard 524 may store the same context information as billboard 326. Alternatively, billboard 524 may store context information that is different from billboard 326. For example, billboard 524 may store context information that is relevant only to communication subsystem 536A, 536B and/or any resources outside SOC 234B that are accessed by communication subsystems 536A, 536B. The external resources may be shared by other SOCs 234 or coexistence hub device 212. The same context information stored in billboard 326 and billboard 524 may be synchronized or updated based on a voting mechanism or any other predetermined conflict resolution schemes. Billboard 524 may have the same or similar structure as billboard 326 described above with reference to FIG. 4B.

Although the structure and functions of SOC 234B are explained above with reference to FIG. 5, other SOCs in system 210C or other systems 210A, 210B may substantially the same structure and functions.

Example Application Processor with Billboard

Figure 6:
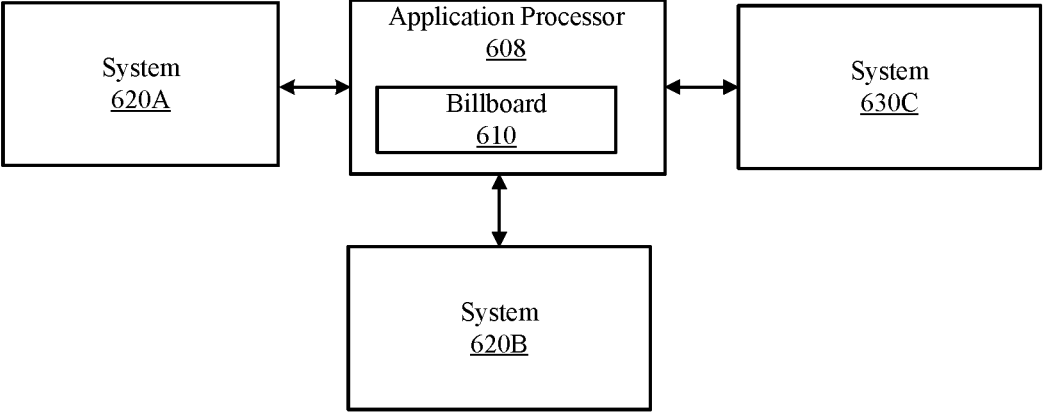
FIG. 6 is a block diagram of an application processor and systems in an electronic device, according to one embodiment.

FIG. 6 is a block diagram illustrating application processor 608 and systems 630A through 630C (collectively referred to herein as "systems 630") in an electronic device, according to one embodiment. In the embodiment of FIG. 6, billboard 610 is implemented in application processor 608 instead of coexistence hub device 212 of system 210C. Although FIG. 6 illustrates systems 630 as being directly connected to application processor 608, one or more of systems 630 may communicate indirectly with application processor 608. Moreover, a subset of systems 630 may communicate with application processor 608 over one type of bus (e.g., PCIe) while other systems communicate over another type of bus (e.g., SPMI). In one or more embodiments, billboard 610 of application processor 608 remains powered up even if supply power degrades.

The structure and functions of billboard 610 are substantially the same as billboard 326 explained above with reference to FIG. 4B except that billboard 610 is included in application processor 608 and is not part of a coexistence control circuit. In one or more embodiments, application processor 608 sends interrupts when context information stored in billboard 610 is updated so that systems 620 may take appropriate actions. Application processor 608 may cause some components in systems 620 to wake up when certain context information is updated in billboard 610.

Application processor 608 may include various components not illustrated in FIG. 6 such as communication interface for communicating with systems 630, processing cores and memory. These components are not illustrated in FIG. 6 to avoid obfuscating of the embodiments.

In other embodiments, billboard can also be in a front-end control device/subsystem that can only control a number of local radio devices.

Example Process of Operating Synchronization Generator

Figure 7:
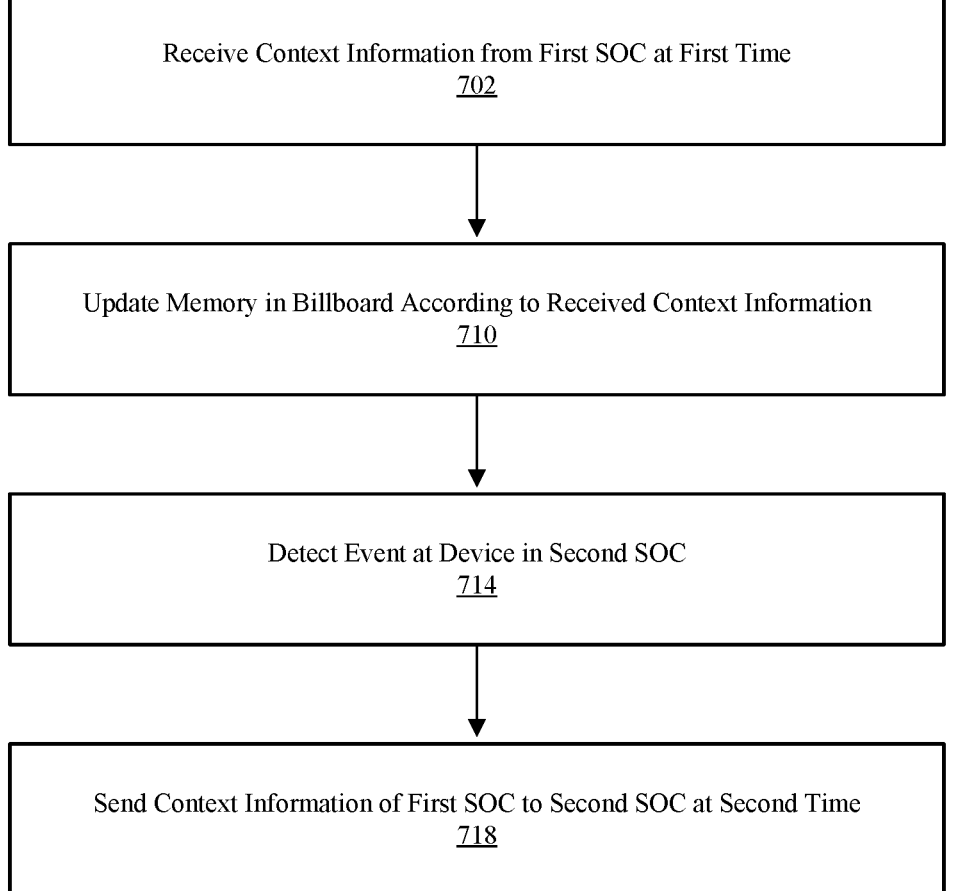
FIG. 7 is a flowchart illustrating the process of operating the billboard, according to one embodiment.

FIG. 7 is a flowchart illustrating the process of operating the billboard, according to one embodiment. A billboard receives 702 context information from a first SOC (e.g., SOC 234B) through a multi-drop bus at a first time. Memory in the billboard is then updated 710 according to the received context information of the first SOC.

The coexistence hub device detects 714 an event in a second SOC (e.g., SOC 234C). Such detection may be made through a message received over the multi-drop bus that indicates, for example, that the second SOC has turned active from a sleep mode or a message including a request for context information from the second SOC.

In response, the context information of the first SOC is retrieved by the billboard and sent 718 to the second SOC at a second time subsequent to the first time. Based on the context information, the second SOC may control or adjust its operations or operations of other SOCs. Alternatively, the second SOC may also receive a notification from the first SoC that the first SOC has updated its context information in the billboard. For example, if the context information received at the second SOC indicates that the operation of the first SOC as indicated by the context information may cause conflicts (e.g., interference of communication frequency), the second SOC may send out a command to the first SOC to adjust the operation of the first SOC or adjust its own operation to avoid the conflicts. As another example, the second SOC may request the first SOC to release control of a shared resource. In response, the first SOC send reply to the second SOC when the shared resource will be released and made available for the second SOC. When the first SOC continues to use the shared resource response, coexistence hub device 212 may intervene and coordinate the use of the shared resource between the first SOC and the second SOC.

Although not illustrated in FIG. 7, further processes of determining whether the first SOC or the second SOC has authority to update or send the context information may be performed before updating 710 the memory or sending 718 the context information. Also, an additional process of sending out the context information or notification upon detection of updates in the context information may be performed by the billboard.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An integrated circuit, comprising:
a processor configured to store an operation policy for controlling operations of the integrated circuit, the operation policy received from an application processor;
one or more communication subsystems; and
a control circuit coupled to the processor and the one or more communication subsystems and configured to be programmed by the processor to enforce the operation policy by making decisions on coexistence events defined by the operation policy that prompt coordination of operations of the integrated circuit, distribute messages to the one or more communication subsystems, or send messages to one or more system circuits coupled to the integrated circuit,
wherein the control circuit comprises a billboard circuit configured to store context information received from a first system circuit of the one or more system circuits and provide the context information to a second system circuit of the one or more system circuits.

2. The integrated circuit of claim 1, wherein the processor is further configured to send a portion of the operation policy to at least one of the first system circuit or the second system circuit via a multi-drop bus to program the at least one of the first system circuit or the second system circuit to operate according to the portion of the operation policy.

3. The integrated circuit of claim 1, wherein the processor is configured to make one or more decisions according to the operation policy by analyzing messages received from the one or more system circuits or the one or more communication subsystems.

4. The integrated circuit of claim 1, wherein the processor is configured to store state information of the one or more communication subsystems, wherein the state information comprises radio frequency (RF) bands or channels in use by the one or more system circuits or the one or more communication subsystems.

5. The integrated circuit of claim 1, wherein the control circuit further comprises:
a dispatcher configured to filter and send messages including context information for the one or more communication subsystems.

6. The integrated circuit of claim 5, wherein the context information is received from the one or more system circuits via a multi-drop bus and through the dispatcher configured to send the context information to the billboard circuit.

7. The integrated circuit of claim 5, wherein the context information triggers one or more operations performed by the one or more system circuits configured to receive the context information.

8. The integrated circuit of claim 5, wherein the billboard circuit is further configured to store a set of data packets being sent from a source system circuit selected among the one or more system circuits and transmitted over a multi-drop bus to the integrated circuit, wherein the set of data packets are available to a system circuit of the one or more system circuits that was in a sleep state and unable to receive the set of data packets while the set of data packets were being transmitted by the source system circuit.

9. The integrated circuit of claim 5, further comprising:
an arbiterer circuit coupled to the dispatcher and the billboard circuit and configured to coordinate operations of the one or more communication subsystems or resolve competing needs of common resources requested by the one or more communication subsystems.

10. The integrated circuit of claim 1, further comprising:
a multi-drop bus coupling the control circuit and the one or more system circuits.

11. A billboard circuit, comprising:
memory circuit configured to store context information, the context information being received from a first system circuit of one or more system circuits via a multi-drop bus and indicating an operating status of the one or more system circuits; and
a security check circuit coupled to the memory circuit and configured to:
determine whether a request received from a second system circuit of the one or more system circuits, wherein the second system circuit is configured to write the context information or read the context information stored in the memory circuit is authorized to access the memory circuit by the system circuit; and
approve the request in response to a determination that the second system circuit is authorized to access the memory circuit.

12. The billboard circuit of claim 11, wherein the context information comprises a device address data field or a security code data field, the device address data field indicating a physical or logical address of the second system circuit associated with the context information, and the security code comprising data for authenticating whether the request to read or write the context information by the second system circuit is authorized to access the memory circuit.

13. The billboard circuit of claim 11, wherein to determine whether the request received from the second system circuit is authorized to access the memory circuit, the security check circuit is configured to:

determine whether a device address or a security code included in the request from the second system circuit matches a corresponding device address or a corresponding security code stored in a memory device; and enable, in response to a determination that the device address or the security code included in the request matches the corresponding device address or the corresponding security code, a memory access circuit of the billboard circuit to read or write context information to or from the memory circuit.

14. The billboard circuit of claim 11, further comprising:

a status check circuit configured to receive periodic heartbeat messages from the one or more system circuits and perform operations to update or lock the context information of the one or more system circuits stored in the memory circuit.

15. The billboard circuit of claim 11, further comprising:

a notification circuit configured to track updates in the context information stored in the memory circuit and send a notification to the one or more system circuits.

16. A method, comprising:

storing, by a processor, an operation policy for controlling operations of an integrated circuit, the operation policy being received from an application processor, and the integrated circuit comprising the processor, a control circuit, and one or more communication subsystems;

programming, by the processor, the control circuit coupled to the processor, to enforce the operation policy by making decisions on coexistence events defined by the operation policy that prompt coordination of operations of the integrated circuit, distribute messages to the one or more communication subsystems, or send messages to one or more system circuits coupled to the integrated circuit;

storing, by a billboard circuit of the control circuit, context information received from a first system circuit of the one or more system circuits; and providing, by the billboard circuit, the context information to a second system circuit of the one or more system circuits.

17. The method of claim 16, further comprising:

sending a portion of the operation policy to at least one of the first system circuit or the second system circuit via a multi-drop bus to program the at least one of the first system circuit or second system circuit to operate according to the portion of the operation policy.

18. The method of claim 16, further comprising:

analyzing messages received from the one or more system circuits or the one or more communication subsystems to make one or more decisions according to the operation policy.

19. The method of claim 16, further comprising:

storing, by the processor, state information of the one or more communication subsystems, wherein the state information comprises radio frequency (RF) bands or channels in use by the one or more system circuits or the one or more communication subsystems.

20. The method of claim 16, wherein the context information triggers one or more operations performed by the one or more system circuits that receive the context information.

\* \* \* \* \*